(12) United States Patent
Gajewski et al.

(10) Patent No.: US 8,550,945 B2
(45) Date of Patent: Oct. 8, 2013

(54) VIBRATION COMPENSATING PULLEY

(75) Inventors: Witold Gajewski, Richmond Hill (CA); Terry P. Cleland, Pickering (CA); Gary J. Spicer, Mississauga (CA); Zbyslaw Staniewicz, Coldwater (CA)

(73) Assignee: Litens Automotive Partnership, Woodbridge (CA)

( * ) Notice: Subject to any disclaimer, the term of this patent is extended or adjusted under 35 U.S.C. 154(b) by 346 days.

(21) Appl. No.: 12/752,511

(22) Filed: Apr. 1, 2010

(65) Prior Publication Data

US 2010/0190592 A1   Jul. 29, 2010

Related U.S. Application Data

(63) Continuation of application No. 10/593,795, filed on Sep. 21, 2006, now abandoned.

(51) Int. Cl.
*F16H 55/00* (2006.01)
*F16H 55/36* (2006.01)

(52) U.S. Cl.
USPC ............................................. 474/166; 474/47

(58) Field of Classification Search
USPC ............... 474/69, 73, 74, 86, 87, 273, 88, 89, 474/148, 166, 47
See application file for complete search history.

(56) References Cited

U.S. PATENT DOCUMENTS

| | | | |
|---|---|---|---|
| 510,283 A * | 12/1893 | McIntyre | 474/29 |
| 2,176,335 A * | 10/1939 | Gray | 474/175 |
| 2,198,831 A * | 4/1940 | Moyer | 474/177 |
| 3,205,022 A | 9/1965 | Eckert | |
| 3,438,360 A * | 4/1969 | Turner | 123/90.31 |
| 4,363,999 A * | 12/1982 | Preikschat | 318/53 |
| 4,507,104 A | 3/1985 | Clark | |
| 4,539,000 A * | 9/1985 | Gayer | 474/13 |
| 4,559,512 A * | 12/1985 | Yaeger et al. | 337/140 |
| 4,642,070 A * | 2/1987 | Walker | 474/57 |
| 4,936,812 A | 6/1990 | Redmond | |
| 5,492,390 A * | 2/1996 | Kugelmann, Sr. | 301/5.1 |
| 5,520,583 A | 5/1996 | Balingit et al. | |
| 5,690,375 A * | 11/1997 | Schneider | 295/33 |
| 5,971,721 A | 10/1999 | Carstensen | |
| 7,669,679 B2 * | 3/2010 | Rastegar et al. | 180/165 |
| 2003/0104886 A1 | 6/2003 | Gajewski | |
| 2004/0051373 A1* | 3/2004 | Tolkachev | 301/55 |

FOREIGN PATENT DOCUMENTS

| | | | |
|---|---|---|---|
| CA | 2463715 | | 6/2003 |
| JP | H01-095538 | * | 6/1989 |
| WO | 03046413 | | 6/2003 |

* cited by examiner

*Primary Examiner* — William A Rivera
*Assistant Examiner* — Henry Liu
(74) *Attorney, Agent, or Firm* — Harness, Dickey & Pierce, P.L.C.

(57) ABSTRACT

A pulley has a hub and a rim. The hub is configured to be mountable on a driving shaft. A driving connection between the hub and rim is provided. In a first embodiment, a drive mechanism is operable to configure the rim between a circular profile and a non-circular profile. The non-circular profile produces a counteracting torque to offset load torques produced by the engine. The drive mechanism can be electrical, inertial, hydraulic or any combination thereof. In a second embodiment, the rim is fixed with a non-circular profile.

13 Claims, 9 Drawing Sheets

VIBRATION COMPENSATING PULLEY

CROSS-REFERENCE TO RELATED APPLICATIONS

This application is a continuation application of U.S. patent application Ser. No. 10/593,795, filed Sep. 21, 2006 now abandoned, which application claims the benefit of U.S. Provisional Application Ser. No. 60/558,922, filed Apr. 2, 2004. The entire disclosures of each of the above applications are incorporated herein by reference.

FIELD OF THE INVENTION

The invention relates to a pulley for drive system of an internal combustion engine. More particularly, the invention relates to pulley having a shape that counteracts and substantially reduces mechanical vibrations, in particular but exclusively in internal combustion engines.

DESCRIPTION OF THE RELATED ART

The serpentine accessory belt of the internal combustion engine drives devices like an alternator, an air conditioning compressor, a water pump, and a power steering pump. The energy is provided by the engine's crankshaft and is transmitted to driven components via a poly-V belt. This power delivery is not smooth. It occurs with the speed fluctuating intensely particularly at low rpm. Crankshaft torsionals are caused by the cycles of the internal combustion engine (intake, compression, combustion and exhaust). Particularly, the combustion cycle affects the amplitude of crankshaft torsionals.

When the frequency of these vibrations is close to the natural frequency of the drive, system resonance occurs. At resonance, the torsional vibrations and the span tension fluctuations are at their maximum. Tension fluctuations at resonance can easily cause the belt to slip on the crankshaft pulley or on the other pulleys depending on the magnitude of tension fluctuations, wrap angle, friction factor, etc. The belt slip is undesired because it disrupts power transmission, produces noise and reduces belt life. Vibrations may also cause wear of other components and result in other undesirable effects.

A novel approach to attenuating vibrations in internal combustion engines has been proposed in WO 03/046413. In this commonly assigned patent publication, it is proposed that a synchronous drive system in an engine be provided with a pulley or sprocket that has a non-circular profile. The non-circular profile produces an opposing fluctuating corrective torque. The angular position of the non-circular profile coincides with an angular position for which a maximum elongation of the drive span coincides with a peak value of the fluctuating load torque of the rotary load.

In the prior publication, the non-circular pulley or drive sprocket is fixed. However in many engines, as the RPM increases, the engine usually has smaller fluctuations in load torque. Thus, the need to introduce a counteracting torque as provided by the non-circular profile also diminishes. With a fixed profile, the counteracting torques will nonetheless be introduced into the drive system.

SUMMARY OF THE INVENTION

It is desirable to provide a rotor or pulley for a drive apparatus, wherein the rotor or pulley has a non-circular profile and an indicia marking enabling the pulley to be installed on a crankshaft in a desired orientation.

It is desirable to provide a rotor or pulley for a drive apparatus, wherein the rotor or pulley is able to alter its profile between a non-circular profile and a circular profile, so that the rotor can be dynamically altered depending on engine conditions.

According to one aspect of the invention, there is provided a pulley having a hub configured to be mountable on a driving shaft and a rim. There is a driving connection between the hub and rim. A drive assembly is operable to configure the rim between a circular profile and a non-circular profile. The drive assembly can be electrical, inertial, hydraulic or any combination thereof.

According to another aspect of the invention, there is provided a method for operating an engine. The engine has an endless drive system including a configurable crankshaft pulley. The method includes the steps of sensing engine conditions, such as RPM, accessory drive belt tension, to determine whether torque loads in the endless drive are in excess or about to be in excess of a predetermined value and responsively altering the profile of the crankshaft pulley between a circular and a noncircular profile to generate a counteracting torque in the belt.

According to another aspect of the invention, there is provided a pulley having a hub and a rim. The hub is configured to be mounted on a driving shaft, such as a crankshaft. The rim has a non-circular profile. The pulley has indicia thereon for orienting the pulley in a predetermined position relative to the driving shaft.

According to another aspect of the invention, there is provided a pulley having a hub and a rim. The hub is configured to be mountable on a driving shaft. The rim has a non-circular profile. The hub has means for orienting the hub in a predetermined position relative to the driving shaft.

BRIEF DESCRIPTION OF THE DRAWINGS

Advantages of the invention will be readily appreciated as the same becomes better understood by reference to the following detailed description when considered in connection with the accompanying drawings wherein.

DETAILED DESCRIPTION OF THE PREFERRED EMBODIMENT

Figure 1:
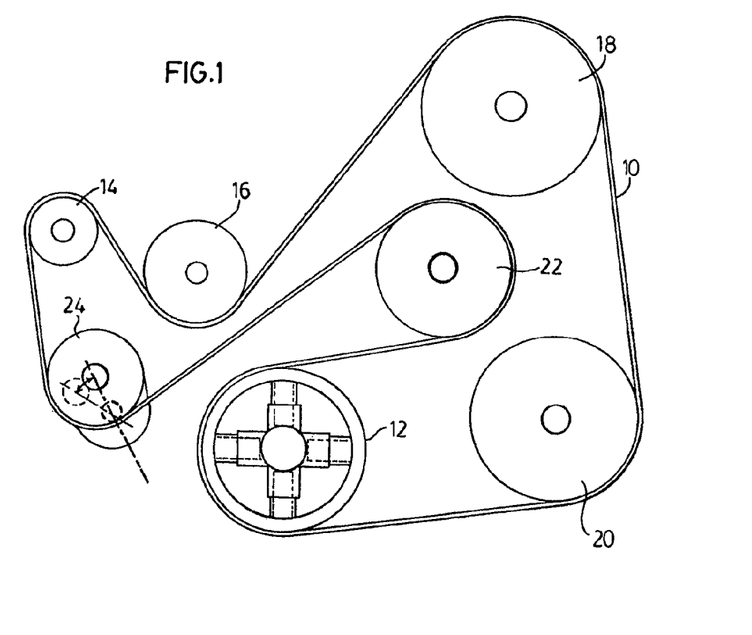
FIG. 1 is a schematic view of a front of a vehicle engine with an endless belt extending through a serpentine path around a plurality of conventional pulleys and a pulley of the present invention.
Figure 2:
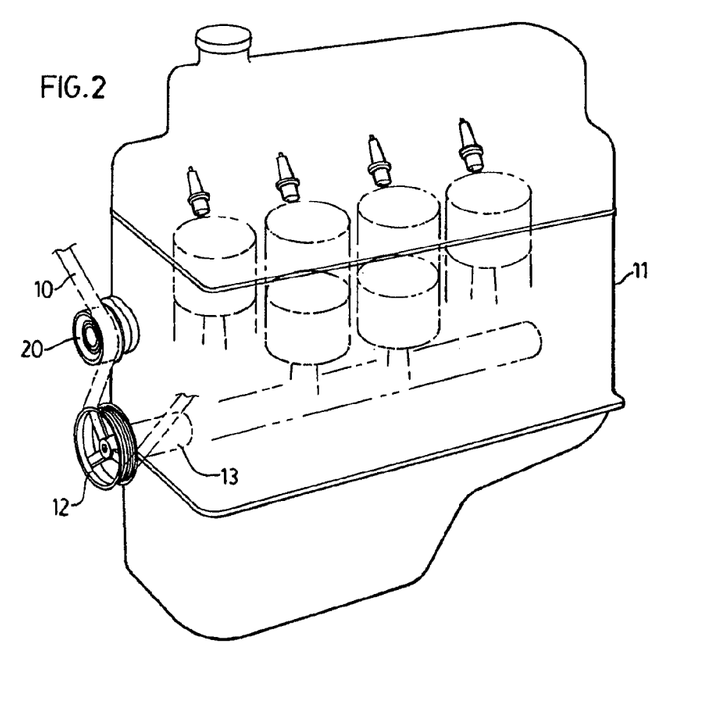
FIG. 2 is a partial perspective view of an engine incorporating a pulley of the present invention.

Referring to FIGS. 1 and 2, an endless belt 10 is shown extending through a serpentine path. Typically, the endless belt 10 is mounted on the front of an engine 11 for driving various accessories or components. Alternatively, the endless belt 10 may also be a chain, particularly timing systems, as is known in the art. The curved serpentine path is defined by six pulleys 12, 14, 16, 18, 20, 22 and a tensioner pulley 24. The pulleys 12, 14, 16, 18, 20 are shown here by way of example, although not every internal combustion engine includes all of these pulleys. In the present example, the pulleys are as follows: a crank shaft pulley 12, an alternator pulley 14, an idler pulley 16, a power steering pulley 18, an air conditioning pulley 20 and a water pump pulley 22. Depending on the location and size of the pulley 12-24 various percentages of the periphery of each of the pulleys 12-24 are engaged by the belt 10.

The belt 10 can transfer in excess of 3000 Newtons of force for driving the various components of the internal combustion engine. Typical forces required to drive an accessory drive or timing drive vary widely with the engine and application. However, in most cases, a typical force range is somewhere in the region of 300 N to 500 N, when measured on the "slack side" of the belt. A typically low applied belt tension would be in the 100 N range. A typically high force range is somewhere in the range of 1000 to 2000 N.

Figure 3:
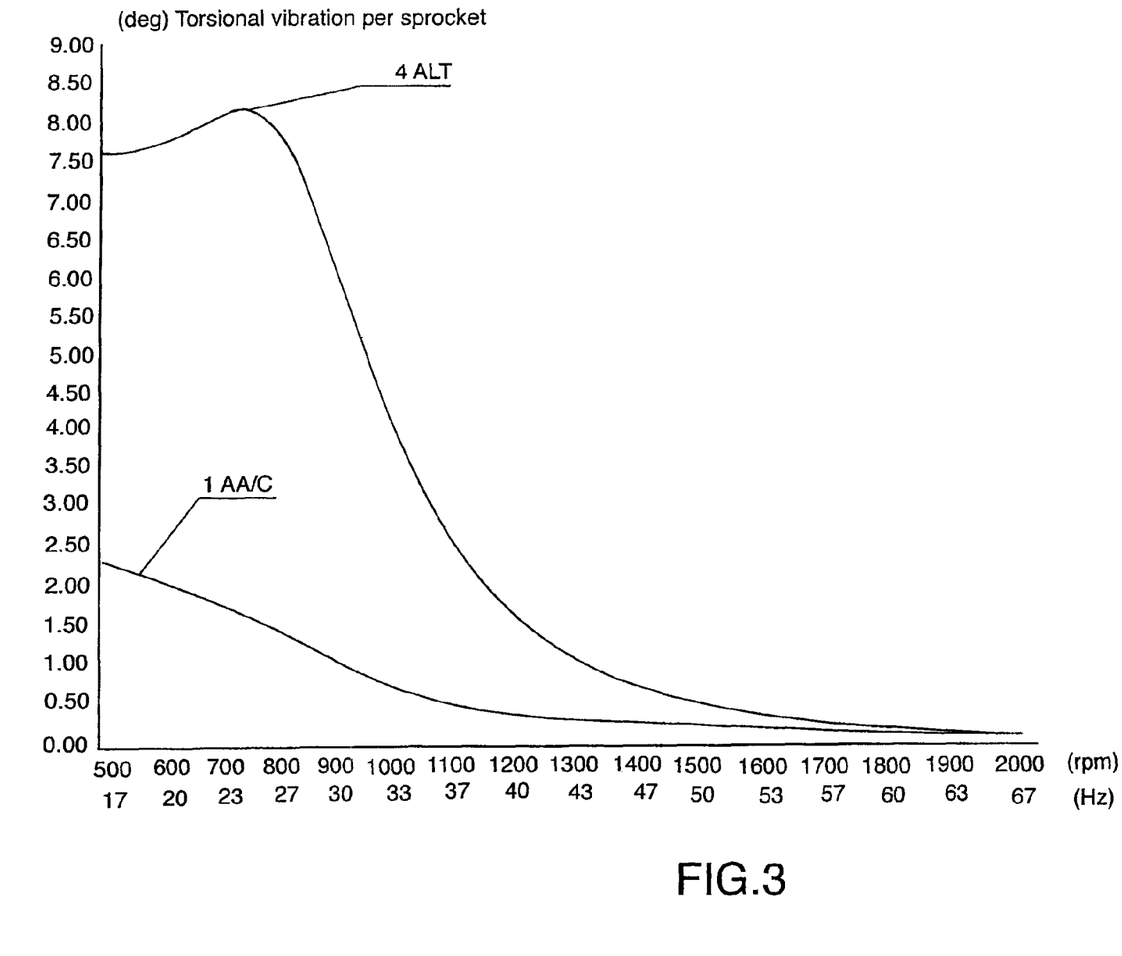
FIG. 3 is a graph illustrating the relationship between torsional vibrations of a typical four cylinder engine resulting from an air conditioner compressor and an alternator.

Referring to FIG. 3, a graph illustrates the relationship between the torsional vibrations in degrees versus the speed of the engine in RPM on two components of the engine, namely the alternator pulley and the air conditioner compressor pulley for a typical four cylinder engine. As is illustrated, relatively high torsional vibrations are observed at about 500 to 750 RPM and as the engine speed increases, the torsional vibrations diminish.

Figure 4:
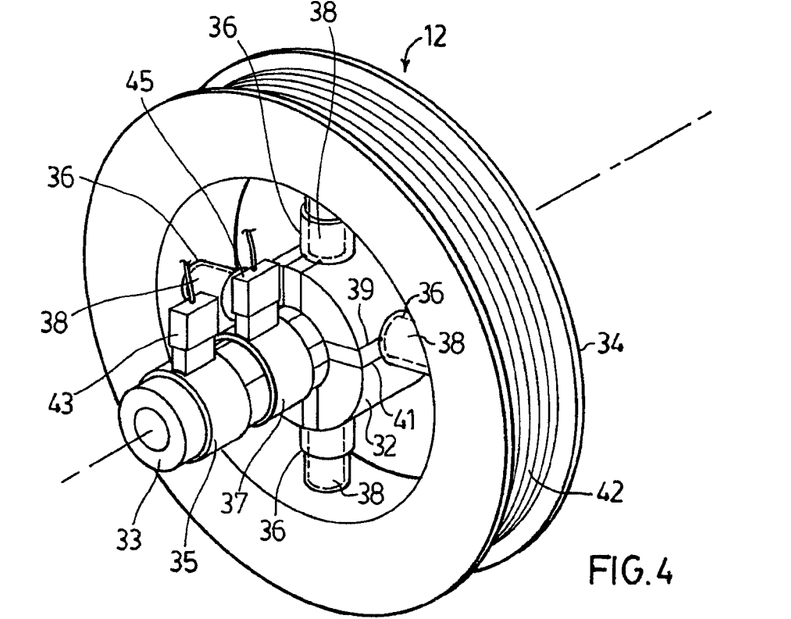
FIG. 4 is perspective view of a first embodiment of a pulley of the present invention.
Figure 5:
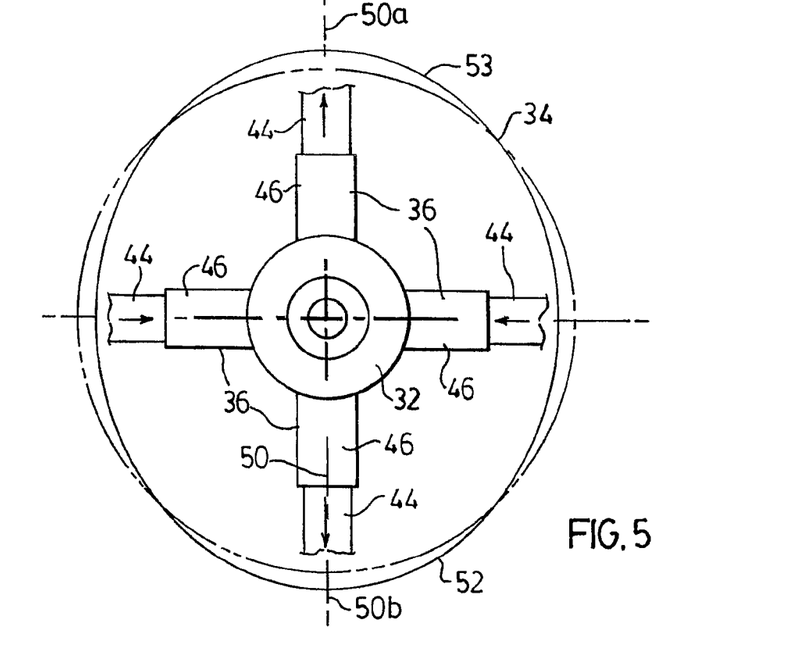
FIG. 5 is a partial elevational view of the pulley of FIG. 4.

Referring now to FIGS. 4 and 5, a rotor or pulley 12 of the present invention is illustrated. The pulley 12 generally comprises a hub 32, a rim 34 and a plurality of circumferentially spaced torque transfer sleeves 36. Inside each sleeve 36 is a drive actuator 38.

Hub 32 is configured for mounting on the end of the crankshaft of the engine. Hub 32 is oriented on the crankshaft relative to the top dead center mark. Hub 32 is provided with an axle 33. A pair of copper sleeves 35, 37 is mounted for rotation with the axle 33 and hub 32. An electrical connection 39 is provided from sleeve 35 to each of the actuators 38, presenting a first voltage rail. An electrical connection 41 is provided from sleeve 37 to each of the actuators 38, presenting a second voltage rail. A pair of brushes 43, 45 is mounted to engage the sleeves 35, 37, respectively, to provide current to the sleeves 35, 37 as the hub 32 rotates. Each of the brushes 43, 45 are connected to a satellite controller 52.

Rim 34 is generally ring shaped, having an outer circumferential surface 42. The outer circumferential surface has poly-V grooves, which are conventional in the art. Rim 34 is relatively stiff but is capable of a degree of flexibility or malleability. Preferably, rim 34 is molded from an organic resin material, such as Nylon. Additional reinforcement materials, such as glass fibres, nano particles, may be added to increase strength. On a conventional sized engine, the rim 34 must be capable of repeatably flexing about 4 mm in diameter along the major diameter.

Each of sleeves 36 consists of an inner sleeve 44 and an outer sleeve 46. The inner sleeves 44 are mounted to the hub 32 and the outer sleeves 46 are mounted to the rim 34. The sleeves 44, 46 slide relative to each other yet provide a driving connection between the hub 32 and the rim 34 enabling torque to be transferred from the crankshaft 13 to the belt 10. Sleeves 36 provide a flexible driving connection between the hub 32 and the rim 34. As is now apparent to those skilled in the art, the particular arrangement of the sleeves could be reversed without departing from the present invention. Additionally, other flexible driving arrangements, such as a rubber ring may also be utilized to provide the flexible driving connection.

The number of sleeves 36 will depend upon the number of cylinders of the engine. For example, a four cylinder or V-8 engine will preferably have four or multiples of four actuators 36. An inline six or V-6 engine will preferably have three or multiples of three actuators 36.

Inside each sleeve is a drive actuator 38. In the present embodiment, actuator 38 is a shape memory alloy (SMA) actuator, as is well know in the art. Examples of such actuators are detailed in U.S. Pat. No. 6,390,878, www.steadlands.com and http://www.cim.mcgill.ca/~grant/sma.html. Other drive actuators such as solenoids may also be substituted.

Upon application of an electrical current, the actuator 38 will responsively expand or retract depending upon the polarity of the current. The actuators 38 will be electrically connected such that certain ones of the actuator 38 will contract and others will expand upon application of an electric current. As illustrated in FIG. 5, two diametrically opposed actuators will expand and the other two diametrically opposed actuators will contract, causing the rim 34 to move from a circular configuration to a non-circular profile or configuration, in this example, oval.

The oval profile of rim 34 has at least one reference radii, in the present example reference radii 50a and 50b, which together form the major axis 50 of the oval and a minor axis 51. Each reference radius 50a, 50b passes from the centre of the rotor 12 and through the centre of the respective protruding portion 52, 53. The angular position of the non-circular profile is related to a reference direction of the rotor 12, the reference direction being the direction of a vector or imaginary line 54 that bisects the angle or sector of wrap of the continuous loop belt 10 around the rotor 12. This vector that bisects the angle of wrap is in the same direction as the hub load force produced by engagement of the belt 10 with the rotor 12 when the belt drive system is static. It should be appreciated, however, that the hub load force direction changes dynamically during operation of the belt drive system. The timing of the non-circular profile is set to be such that, at the time when the torsionals are at a maximum, the peak torsional point, the angular position of the reference radius 50a is about 90° (four or eight cylinders) to 120° (three or six cylinders) from the reference direction of the angle of wrap bisection 54 (FIG. 6), taken in the direction of rotation of the rotor 12.

The magnitude of the eccentricity of the non-circular profile is determined with reference to the amplitude of the peak torsional. In some arrangements the amplitude of the torsional may be substantially constant, and in other arrangements the amplitude of the fluctuating torsional may vary, as illustrated in FIG. 3. Where the amplitude of the fluctuating torsional is constant, the magnitude of the eccentricity is determined with reference to that substantially constant amplitude of fluctuating torsional. Where the amplitude of the fluctuating torsional varies, the value thereof which is used to determine the magnitude of the eccentricity will be selected according to the operating conditions in which it is desired to eliminate or reduce the unwanted vibrations.

For each engine, the dynamic peak torsional point can be measured relative to the crankshaft angle. The orientation of the rotor 12 of the present invention relative to the crankshaft can be predetermined. In particular, the minor reference radius 50 is positioned within the first quadrant of the belt wrap a with the peak torsional point.

Figure 6:
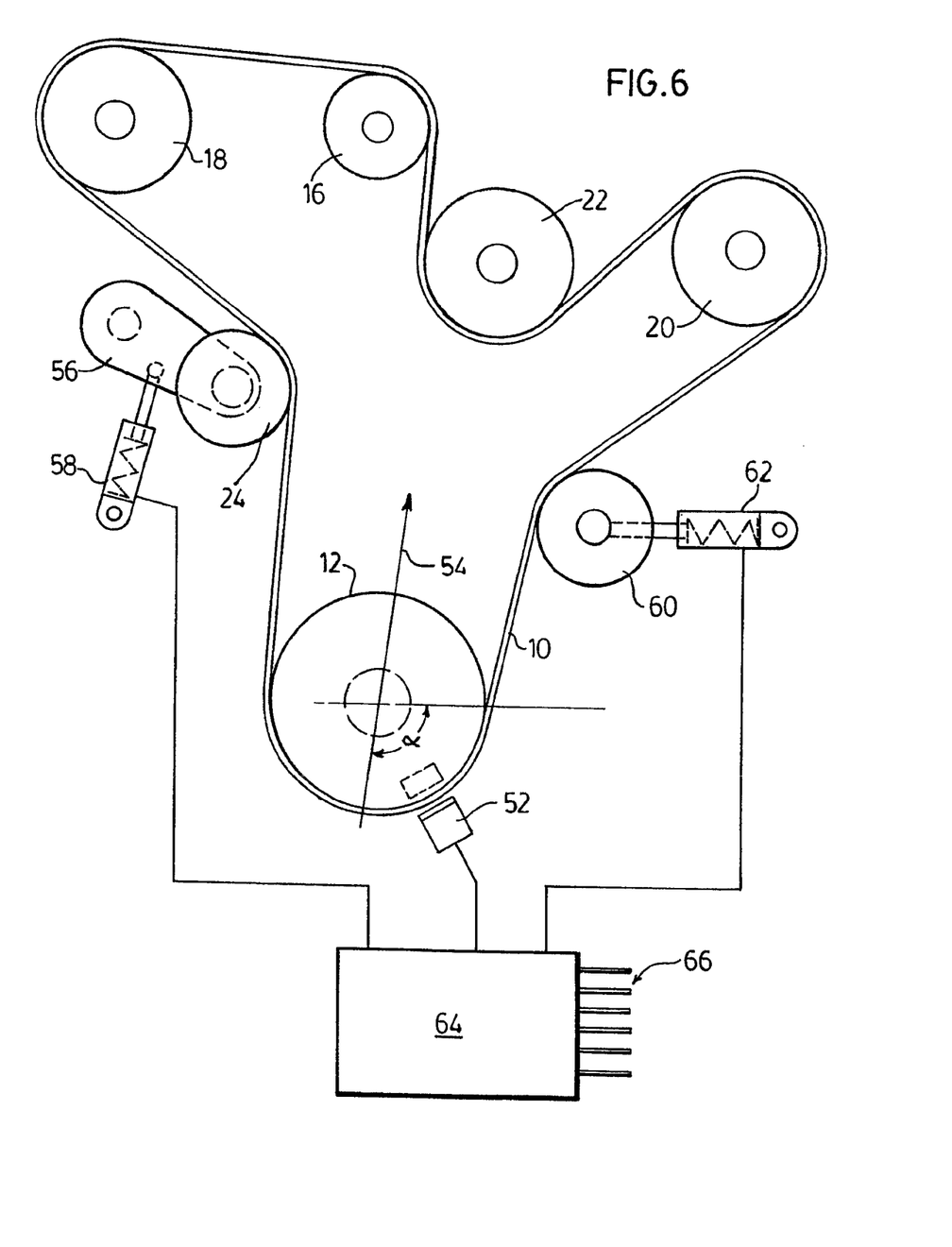
FIG. 6 is schematic view of an endless drive system similar to FIG. 1 but having a different arrangement of pulley elements.
Figure 7:
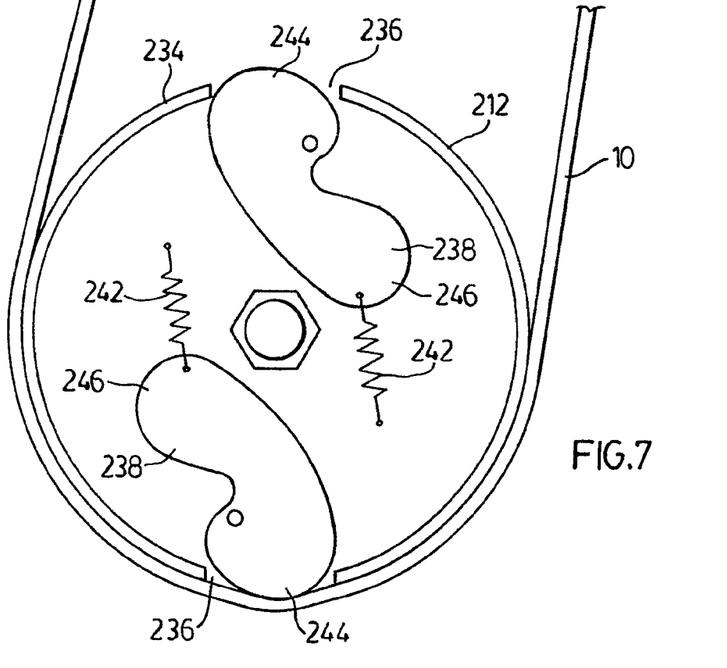
FIG. 7 is a plan view of a second embodiment of the present invention, with the inertia elements in the non-circular profile position.

Referring to FIG. 6, a schematic of a typical engine is illustrated. The arrangement is similar to the schematic of FIG. 1. Both arrangements are provided for illustration purposes only. Tensioner 56 is provided with a position sensor 58. Position sensor 58 measures the relative position of the tensioner pulley 24 and generates a tensioner position signal. Take-up pulley 60 is also provided with a position sensor 62. Position sensor 62 measures the relative position of the take-up pulley and generates a take-up pulley signal. The tensioner position signal and the take-up pulley signal are proportional to belt tension on the respective sides of pulley 12 or the present invention. The two signals are fed into a controller 64. Controller 64 also receives inputs 66 from other vehicle sensors to provide information such as engine speed, and engine load. Controller 64 compares the signals to determine if the engine is experiencing relatively high torsionals. The controller 64 responsively sends a signal to satellite processor 52 to energize the actuators 38 in a first polarity, altering the profile or configuration of the pulley 12 from circular to non-circular. Once the controller 64 determines that the engine is operating in a range outside of the relatively high torsionals, the controller 64 sends a signal to the satellite processor 52, which responsive energizes the actuators 38 in a second polarity, opposite the first polarity, returning the pulley 12 to a circular profile or configuration.

Figure 8:
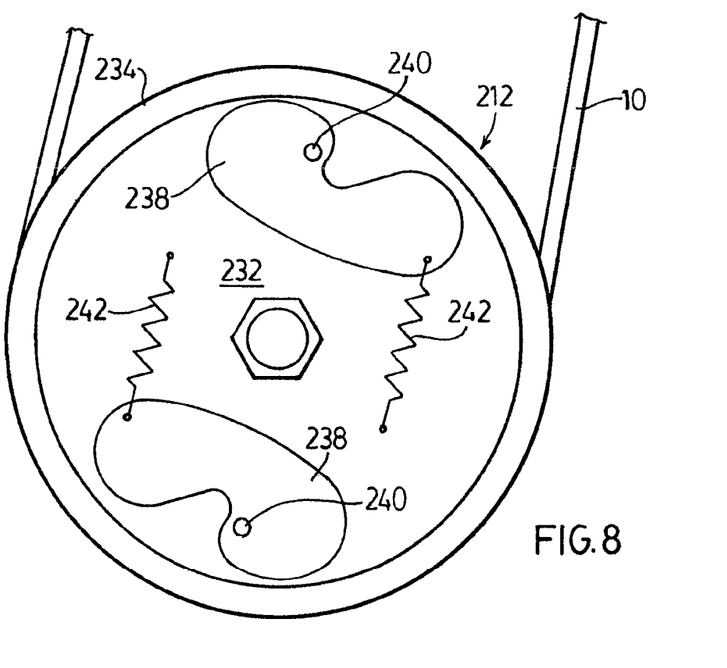
FIG. 8 is a plan view of the embodiment of FIG. 7, with the inertia elements in the circular profile position.
Figure 9:
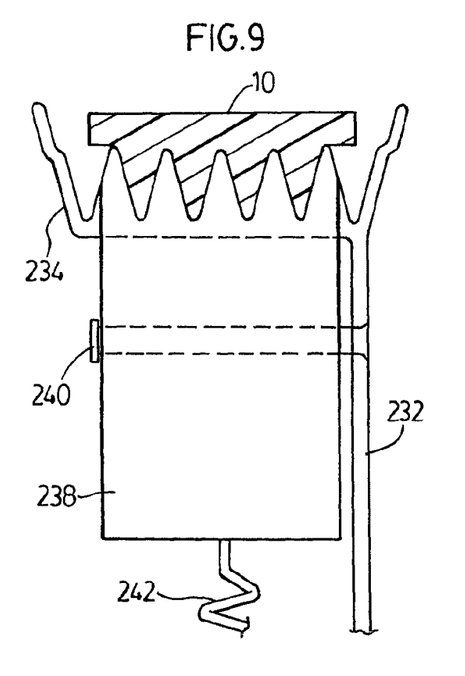
FIG. 9 is a partial sectional view of the embodiment of FIG. 7, with the inertial element in the circular profile position.
Figure 10:
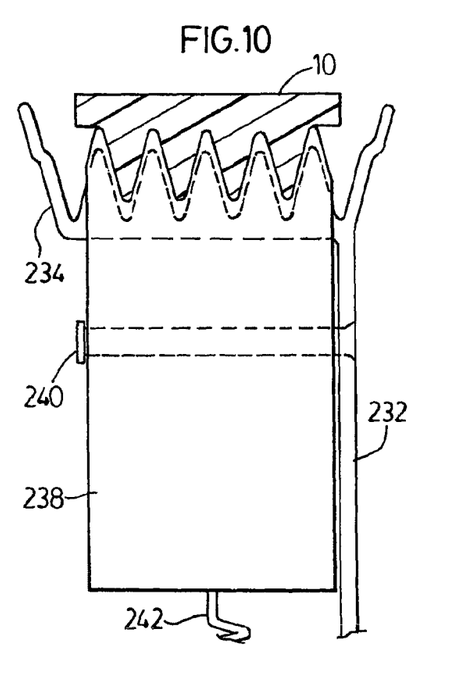
FIG. 10 is a partial sectional view of the embodiment of FIG. 7, with the inertial element in the non-circular profile position.

Referring to FIGS. 7-10, a second embodiment of the present invention is illustrated. The pulley 212 is conventional in design in that the pulley 212 has a hub 232 and a rim 234. Preferably, pulley 212 is made of sheet steel according to U.S. Pat. No. 4,273,547. The outer rim 234 is provided with cut-outs or openings 236, preferably diametrically opposed. A series of inertia elements 238 are pivotally mounted on the hub 232 at pins 240. Each inertia element 238 has head portion 244 and a tail portion 246. The inertia elements 238 are each connected to a spring 242 at the tail end 246. The head portion has a series of V-grooves, matching the V-grooves of the outer rim 234. The inertia elements 238 are mounted to pivot between a non-circular profile position (FIGS. 7 and 10) and a circular profile position (FIGS. 8 and 9).

The spring rate of springs 238 and the mass of the inertia elements 238, particularly the ratio of the tail portion 246 versus the head portion 244, is selected such that at low RPM the spring 242 urges the inertia element 238 to pivot about pin 240 to extend the head portion 244 outwardly. In this non-circular profile position, the head portion 244 extends outwardly from the circumferential extent of the outer rim 234, presenting a series of lobes or bumps. At higher RPM, the inertial forces overcome the spring forces causing the inertia elements 238 to pivot about pin 240 to retract head portion 244, presenting a generally circular profile on the outer rim 234.

Optionally, the springs 238 could be replaced or supplemented with actuators, preferably SMA actuators.

As with the first embodiment, the number of inertia elements depends on the number of cylinders of the engine. For four and eight cylinder engines, the pulley 212 of the present invention has two or four inertia elements 238. For six or twelve cylinder engines, the pulley 212 has three or six inertia elements 238. Positioning of the lobes or bumps relative to TDC is determined in the same fashion as the first embodiment. The present embodiment is passive device, only responsive to RPM of the engine.

Figure 11:
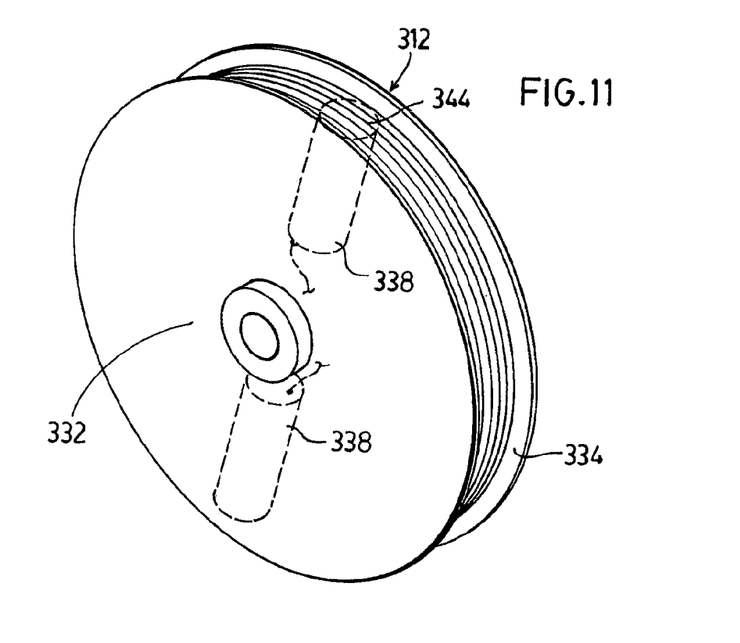
FIG. 11 is perspective view of a third embodiment of the present invention.
Figure 12:
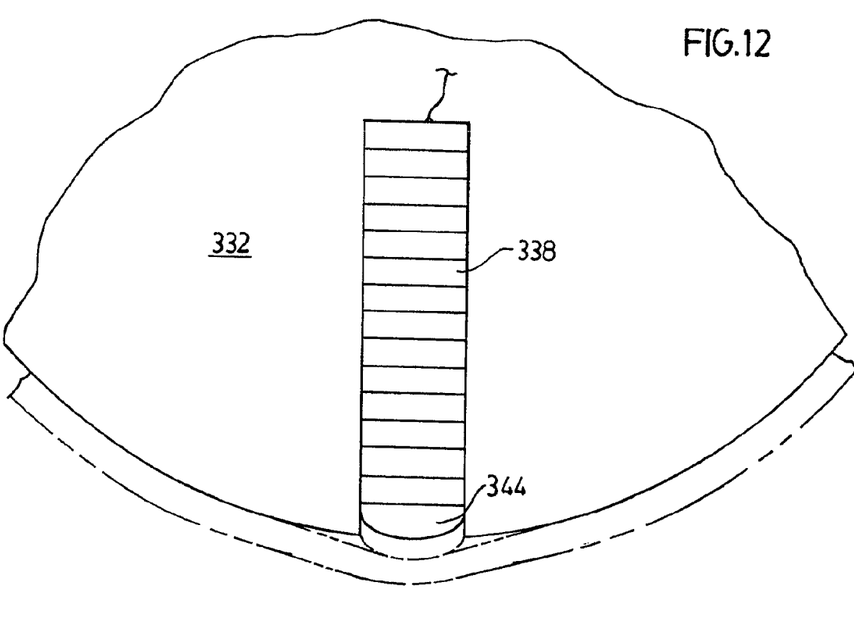
FIG. 12 is a partial plan view of the embodiment of FIG. 11.

Referring to FIGS. 11 and 12, a third embodiment of the present invention is illustrated. This embodiment 312 is similar to the first embodiment in that it is a dynamic or active device. In this embodiment, a piezoelectric stack 338 is mounted to the hub 332. The rim 334 has a series of apertures in the V-grooves. The stack 338 has a head portion 344 that is configured to correspond with the poly-V grooves of rim portion 334. The pulley 312 is provided with an electrical connection similar to the first embodiment. Upon energizing the stack 338, the head portion 344 extends outwardly to present a non-circular profile. Upon de-energizing the stack 338, the head portion 344 retracts inwardly to present a circular profile.

Figure 13:
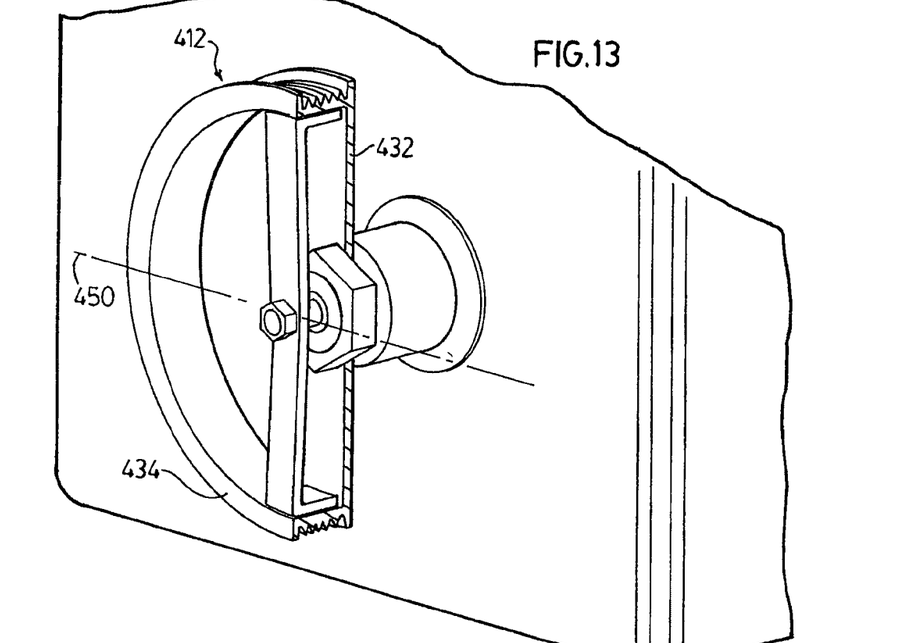
FIG. 13 is a perspective view, partially in sectional, of fourth embodiment of the present invention.
Figure 14:
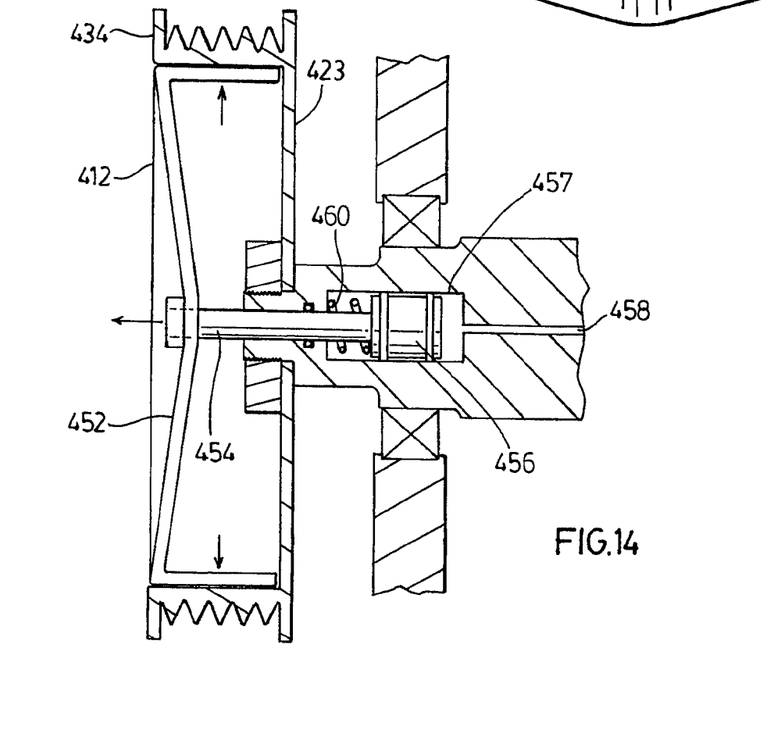
FIG. 14 is sectional view of the embodiment of FIG. 13.

Referring to FIGS. 13 and 14, a fourth embodiment of the pulley of the present invention is illustrated. Pulley 412 has a hub 432 connected to a rim 434. Preferably, hub 434 has a non-circular profile having a major axis 450 of an oval. Preferably, hub 432 and rim 434 are relative stiff but flexible, molded with an organic resin material. Hub 432 must be capable of stretching along the minor axis about 4 mm. Apertures could be provided in hub 432 to allow for such movement.

The center of the spreader 452 operatively engages a rod 454 the is connected to an hydraulic plunger 456 of cylinder 457. Cylinder 457 communicates with the oil lubricating network of the engine via passageway 458. Return spring 460 provides a return force on the hydraulic plunger 456.

A spreader 452 is mounted along the minor axis of the oval. The spreader 452 is generally sigma-shaped in cross section with the upper and lower portions engaging the inner face of rim 434.

At low RPM, the engine oil pressure is also low. The hydraulic forces acting on plunger 456 is low allowing the spring 460 to retract rod 454. In this condition, the outer rim 434 will present a non-circular profile. As the RPM increases, so does the engine oil pressure. The hydraulic cylinder 456 begins to overcome the bias of the spring 460 to extend the rod 454. As the rod 454 extends, the spreader 452 urges the minor axis of the outer rim 434 to move outwardly to present a generally circular profile.

Figure 15:
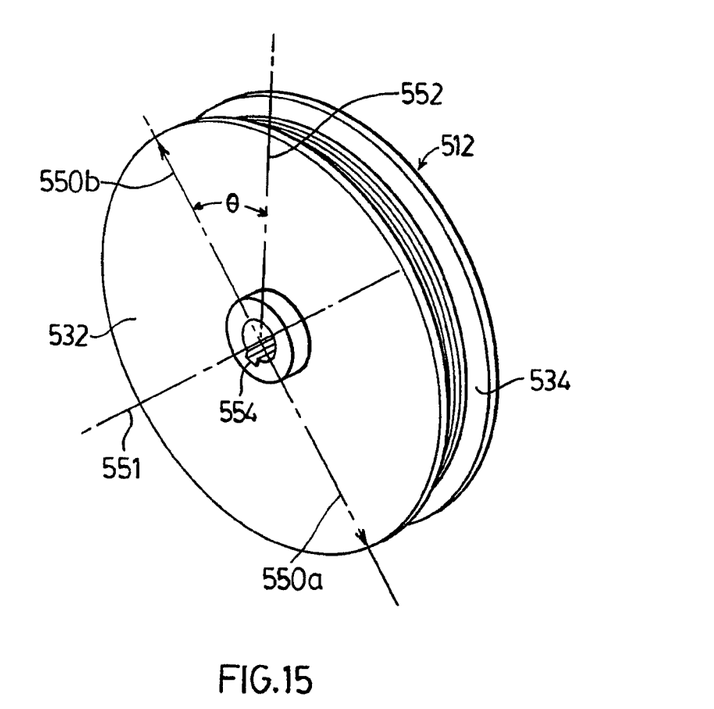
FIG. 15 is a perspective view of a fifth embodiment of the pulley or rotor of the present invention.

Referring to FIG. 15, a fifth embodiment is illustrated. In this embodiment, the rotor 512 has a non-circular profile having a major axis 550 defined by reference radii 550a and 550b and a minor axis 551. The rotor 512 has a hub 532 and an outer rim 534. The rotor 512 is provided with an orientation indicia or other marking to enable the rotor 512 to be installed on an end of crankshaft in a predetermined orientation. Hub 532 has a reference mark 552, which is located at a predetermined angle θ relative to one of the major reference radii 550a or 550b. Alternatively, the hub 532 can be provided with a key way 554 enabling the pulley 512 to be mounted on the crankshaft in only one predetermined orientation. Other known methods of mounting devices in a predetermined orientation may be apparent to those skilled in the art and are incorporated herein.

Many modifications and variations of the invention are possible in light of the above teachings. Therefore, within the scope of the appended claims, the invention may be practiced other than as specifically described.

What is claimed is:

1. An apparatus comprising:
 an endless power transmitting element;
 a plurality of accessories, each of the accessories comprising a pulley that is engaged to the endless power transmitting element to receive rotary power therefrom; and
 a crankshaft pulley having a hub, a rim and means for connecting the hub and the rim, the hub being configured to be coupled to a crankshaft for rotation therewith, the rim defining at least a portion of an outer circumferential surface that is drivingly engaged to the endless power transmitting element, the connecting means drivingly coupling the rim to the hub and including means for attenuating torsional vibration transmitted by the crankshaft pulley from the crankshaft to the endless power transmitting element.

2. The apparatus of claim 1, wherein the attenuating means comprises at least two pair of diametrically opposed actuators, each pair of diametrically opposed actuators defining an axis and being configured to selectively alter a shape of the outer circumferential surface along the axis.

3. The apparatus of claim 2, wherein when the at least two pair of diametrically opposed actuators are activated, a first pair of diametrically opposed actuators is configured to contract the outer circumferential surface and a second pair of diametrically opposed actuators is configured to expand the outer circumferential surface.

4. The apparatus of claim 2, wherein the actuators are electrically operated.

5. The apparatus of claim 2, wherein each of the actuators is a shape memory alloy actuator.

6. The apparatus of claim 1, wherein the rim is formed of an organic resin material.

7. The apparatus of claim 1, wherein the rim has a pair of diametrically opposed openings and wherein the attenuating means comprises a pair of actuators, each of the actuators being selectively actuatable to extend through a corresponding one of the openings in the rim.

8. The apparatus of claim 1, wherein the rim has a pair of diametrically opposed openings and wherein the attenuating means comprises a pair of inertia elements, each of the inertia elements having a head portion that can be pivoted to an extended position where the head portion extends through a corresponding one of the openings.

9. The apparatus of claim 8, wherein the attenuating means further comprises a pair of springs, each of the springs being configured to bias a corresponding one of the inertial elements about a pivot point such that the head portions are in the extended position when the crankshaft pulley is not rotating.

10. The apparatus of claim 1, wherein the attenuating means comprises a hydraulic cylinder that is configured to selectively deform the rim in at least two circumferentially spaced apart locations.

11. The apparatus of claim 1, wherein the attenuating means comprises a hydraulic cylinder having a piston that translates along a rotational axis of the crankshaft pulley.

12. The apparatus of claim 1, wherein the attenuating means is configured to change the shape of the outer circumferential surface from a multi-lobed shape to a non-lobed shape when the crankshaft pulley rotates at a speed that is greater than or equal to 750 rotations per minute.

13. The apparatus of claim 1, wherein the crankshaft pulley includes a timing mark.

\* \* \* \* \*